US011593340B2

(12) United States Patent
Singh et al.

(10) Patent No.: US 11,593,340 B2
(45) Date of Patent: Feb. 28, 2023

(54) NORMALIZING DIGITAL CONTENT ACROSS DATABASES AND GENERATING PERSONALIZED CONTENT RECOMMENDATIONS

(71) Applicant: FMR LLC, Boston, MA (US)

(72) Inventors: Kanwar Bir Singh, Malden, MA (US); Jackie Qun Shi, Southborough, MA (US); Alex Arias-Vargas, Foxboro, MA (US)

(73) Assignee: FMR LLC, Boston, MA (US)

( * ) Notice: Subject to any disclaimer, the term of this patent is extended or adjusted under 35 U.S.C. 154(b) by 538 days.

(21) Appl. No.: 16/712,609

(22) Filed: Dec. 12, 2019

(65) Prior Publication Data

US 2021/0182697 A1    Jun. 17, 2021

(51) Int. Cl.
    *G06F 16/22*    (2019.01)
    *G06F 16/25*    (2019.01)
    *G06F 16/248*   (2019.01)

(52) U.S. Cl.
    CPC ........ *G06F 16/2272* (2019.01); *G06F 16/248* (2019.01); *G06F 16/252* (2019.01); *G06F 16/258* (2019.01)

(58) Field of Classification Search
    None
    See application file for complete search history.

(56) References Cited

U.S. PATENT DOCUMENTS

| 7,500,188 | B1 | 3/2009 | Trapani et al. |
| 8,615,442 | B1* | 12/2013 | Kapur ............... G06Q 30/0269 705/26.1 |
| 8,938,724 | B2 | 1/2015 | Harris et al. |
| 9,830,304 | B1 | 11/2017 | Simeonov et al. |
| 10,311,372 | B1 | 6/2019 | Hotchkies et al. |
| 10,735,270 | B1* | 8/2020 | Whipple ............... H04L 45/02 |
| 11,436,521 | B2* | 9/2022 | Tanglertsampan ..... G06Q 50/01 |
| 2009/0024698 | A1 | 1/2009 | Ho et al. |

(Continued)

OTHER PUBLICATIONS

Wu et al., "Recommendation algorithm based on user score probability and project type", Mar. 2019 (Year: 2019).*

*Primary Examiner* — Dawaune A Conyers
(74) *Attorney, Agent, or Firm* — Cesari & McKenna, LLP (57) ABSTRACT

Methods and apparatuses are described for normalizing digital content across databases and generating personalized content recommendations. A server normalizes structured text for each content item to generate unstructured text. The server converts the unstructured text into a multidimensional content item feature set. The server trains a model based upon user profile information, historical content consumption information, historical content recommendation information, and the feature sets. The server receives a request including a vector associated with a user of a client device. The server executes the model using the vector as input to generate interaction prediction scores. The server selects scores above a threshold and identifies content items associated with each score. The server retrieves identified items for display, including converting the normalized text for the items into a format compatible with the client device, receives a response to the displayed digital content items, and updates the model based upon the response.

24 Claims, 4 Drawing Sheets

(56) References Cited

U.S. PATENT DOCUMENTS

2016/0099854 A1* 4/2016 Swaminathan .. H04N 21/44213
 709/224
2017/0061286 A1* 3/2017 Kumar ............... G06Q 30/0269
2018/0240030 A1* 8/2018 Shen ..................... G06F 16/00
2019/0138656 A1* 5/2019 Yang ................ G06F 16/24578
2020/0007634 A1* 1/2020 Xie ...................... G06F 16/313

* cited by examiner

NORMALIZING DIGITAL CONTENT ACROSS DATABASES AND GENERATING PERSONALIZED CONTENT RECOMMENDATIONS

TECHNICAL FIELD

This application relates generally to methods and apparatuses, including computer program products, for normalizing digital content across a plurality of digital content databases and generating personalized content recommendations.

BACKGROUND

As computing devices such as smartphones, smart televisions, and tablets have become the preferred way for many consumers to interact with digital content items like web pages, content providers and other entities have become interested in generating content recommendations that are tailored to each particular user's interests and preferences, as well as to predict content items that will be of interest to the user and/or solicit an interaction (e.g., a click) from the user. A traditional way of generating such recommendations are through the use of recommender systems, that analyze user behavior to identify similarities between users and/or content in order to select content that is likely to be of interest to certain users.

However, existing recommender systems typically lack mechanisms that leverage historical user content consumption data and user profile information (including but not limited to accounts, transactions, recent activity, etc.), in the context of an artificial intelligence reinforcement learning based paradigm, to generate content recommendations that are determined to have an increased likelihood of interaction from a user. Owing to this, they lack the power of discovering or 'exploring' a user's preferences to previously unseen digital content items. Also, traditional recommender systems lack the ability to continuously learn from the newly observed data and auto-correct themselves over a period time, owing to the shift in data over time. These system also typically do not possess the capability of recommending new digital content items to the right set of users, since the systems lack knowledge of the potential audience who may be interested in the new digital content item.

SUMMARY

Therefore, what is needed are methods and systems that utilize advanced artificial intelligence reinforcement learning techniques through the use of a digital content item recommendation model to identify digital content items that have a predicted likelihood of interaction with one or more users and present these digital content items to the users, then receive feedback on the digital content items to enhance the accuracy of the model. In addition, the techniques described herein provide the advantage of normalizing a wide variety of different digital content items from various sources to ensure the ability to present the digital content items on different device hardware and software platforms. The methods and systems deliver digital content items (such as articles, documents, videos, podcasts, alert messages, webinars, webcasts, etc.) based on the type of content, the user's profile, and the user's historical content engagement history. The techniques described herein also provide the ability for the digital content item recommendation model to auto-correct based on feedback (for example, a click) received from the user for the given recommendation, which is known as online learning in the area of machine learning.

The invention, in one aspect, features a system for normalizing digital content across a plurality of digital content databases and generating personalized content recommendations. The system comprises a plurality of digital content databases, each digital content database comprising one or more digital content items, each digital content item including a corpus of structured computer text and one or more binary content files. The system further comprises a computer data store comprising (i) user profile information for each of a plurality of users, (ii) historical digital content item consumption information for each of the plurality of users, and (iii) historical digital content item recommendation information for each of the plurality of users. The system further comprises a server computing device in communication with the plurality of digital content databases and the computer data store, the server computing device comprising a memory to store computer-executable instructions and a processor that executes the computer-executable instructions. The server computing device normalizes a corpus of structured computer text for each digital content item to generate a corpus of unstructured computer text for the digital content item. The server computing device converts the corpus of unstructured computer text corresponding to each digital content item into a multidimensional content item feature set. The server computing device trains a digital content recommendation model based upon the user profile information for each of a plurality of users, the historical digital content item consumption information for each of the plurality of users, the historical digital content item recommendation information for each of the plurality of users, and the multidimensional content item feature sets for one or more of the digital content items. The server computing device receives, from a client computing device, a digital content item request including a multidimensional vector associated with a user of the client computing device, the multidimensional vector corresponding to digital content consumption features of the user. The server computing device executes the digital content recommendation model using the multidimensional vector as input to generate a plurality of content interaction prediction scores for the user, each content interaction prediction score associated with one of the digital content items. The server computing device selects one or more of the plurality of content interaction prediction scores above a predetermined threshold and identifies the digital content item associated with each selected content interaction prediction score. The server computing device retrieves one or more of the identified digital content items for display on the client computing device, including converting the normalized corpus of unstructured computer text for the identified digital content items into a format compatible with the client computing device and displaying the formatted computer text and the one or more binary content files for the identified digital content items. The server computing device receives a response to the presented digital content items from the client computing device. The server computing device updates the digital content recommendation model based upon the response to the presented digital content items.

The invention, in another aspect, features a computerized method of normalizing digital content across a plurality of digital content databases and generating personalized content recommendations. A server computing device is in communication with a plurality of digital content databases, each digital content database comprising one or more digital content items, each digital content item including a corpus of structured computer text and one or more binary content files. The server computing device is in communication with a computer data store comprising (i) user profile information for each of a plurality of users, (ii) historical digital content item consumption information for each of the plurality of users, and (iii) historical digital content item recommendation information for each of the plurality of users. The server computing device normalizes a corpus of structured computer text for each digital content item to generate a corpus of unstructured computer text for the digital content item. The server computing device converts the corpus of unstructured computer text corresponding to each digital content item into a multidimensional content item feature set. The server computing device trains a digital content recommendation model based upon the user profile information for each of a plurality of users, the historical digital content item consumption information for each of the plurality of users, the historical digital content item recommendation information for each of the plurality of users, and the multidimensional content item feature sets for one or more of the digital content items. The server computing device receives, from a client computing device, a digital content item request including a multidimensional vector associated with a user of the client computing device, the multidimensional vector corresponding to digital content consumption features of the user. The server computing device executes the digital content recommendation model using the multidimensional vector as input to generate a plurality of content interaction prediction scores for the user, each content interaction prediction score associated with one of the digital content items. The server computing device selects one or more of the plurality of content interaction prediction scores above a predetermined threshold and identifies the digital content item associated with each selected content interaction prediction score. The server computing device retrieves one or more of the identified digital content items for display on the client computing device, including converting the normalized corpus of unstructured computer text for the identified digital content items into a format compatible with the client computing device and displaying the formatted computer text and the one or more binary content files for the identified digital content items. The server computing device receives a response to the presented digital content items from the client computing device. The server computing device updates the digital content recommendation model based upon the response to the presented digital content items.

Any of the above aspects can include one or more of the following features. In some embodiments, normalizing the extracted corpus of structured computer text for each digital content item to generate a corpus of unstructured computer text for the digital content item comprises removing programmatic code from the corpus of structured computer text. In some embodiments, the programmatic code comprises HTML tags. In some embodiments, the one or more binary content files comprise one or more of: image files, audio files, video files, JavaScript files, PDF files, or CSS files. In some embodiments, the content interaction prediction score represents a likelihood that the user interacts with the associated digital content item when presented on the client computing device.

In some embodiments, converting the normalized corpus of unstructured computer text for the identified digital content items into a format compatible with the client computing device comprises applying a programmatic structure to the normalized corpus of unstructured computer text, the programmatic structure associated with at least one of a hardware type of the client computing device, an operating system of the client computing device, a browser application of the client computing device, or a native application of the client computing device. In some embodiments, the response to the presented digital content items comprises indicia that the user of the client computing device viewed the presented digital content items or indicia that the user of the client computing device interacted with the presented digital content items. In some embodiments, retrieving one or more of the identified digital content items for display on the client computing device comprises calling one or more content application programming interfaces (APIs) that return the identified digital content items to the server computing device.

In some embodiments, updating the digital content recommendation model based upon the response to the presented digital content items occurs in real-time. In some embodiments, the server computing device stores the corpus of unstructured computer text for the digital content item in association with the one or more binary content files for the digital content item.

In some embodiments, the client computing device comprises a browser application on a computing device or a native application on a computing device. In some embodiments, the computing device comprises a mobile device, a laptop computer, a desktop computer, an internet-of-things (IoT) device, or a voice assistant device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
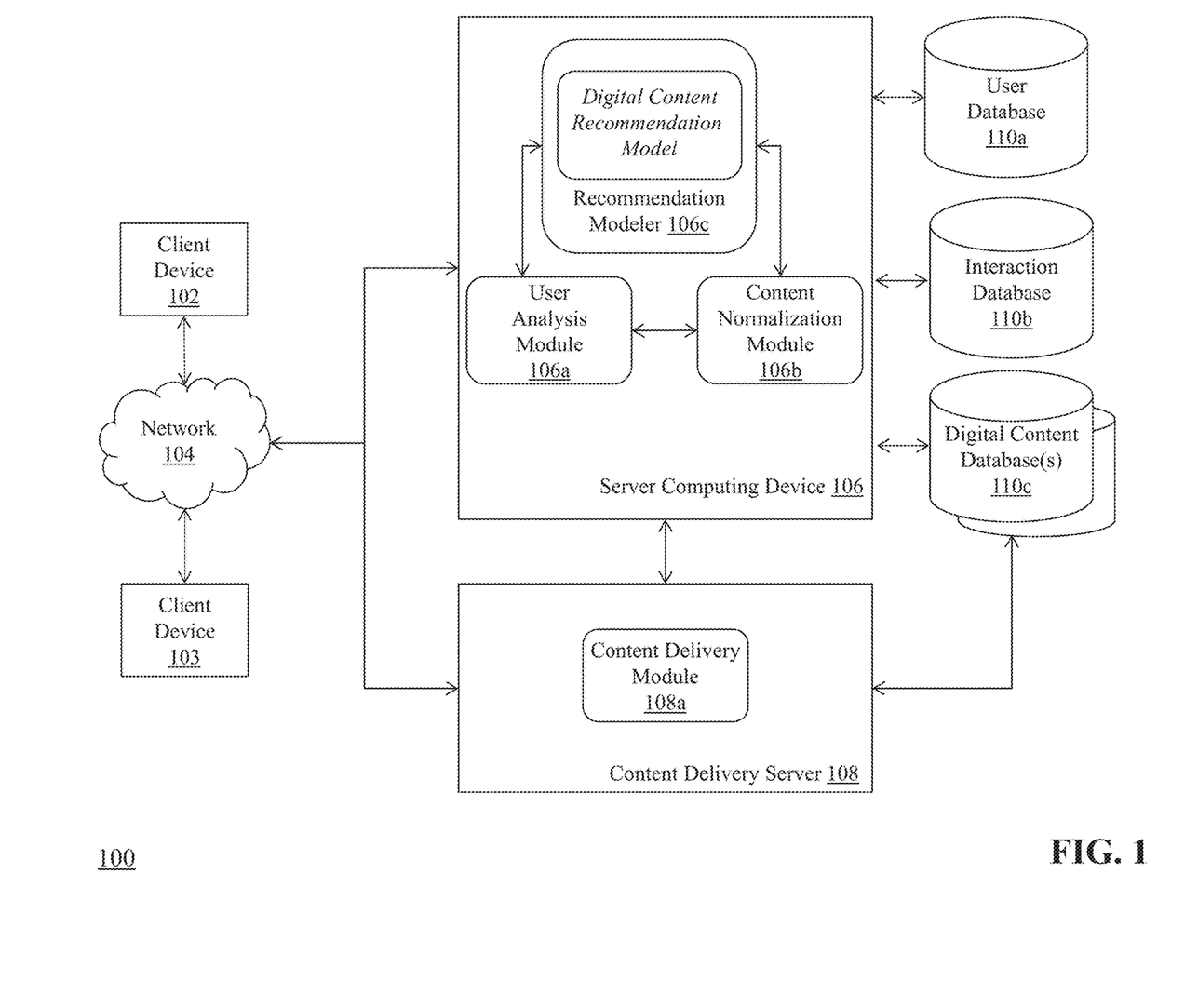
FIG. 1 is a block diagram of a system for normalizing digital content across a plurality of digital content databases and generating personalized content recommendations.

FIG. 1 is a block diagram of a system 100 for normalizing digital content across a plurality of digital content databases and generating personalized content recommendations. The system 100 includes a client computing device 102, a client computing device 103, a communication network 104, a server computing device 106 that includes a user analysis module 106*a*, a content normalization module 106*b*, a recommendation modeler 106c, a content delivery server 108 with a content delivery module 108, and a plurality of databases—a user database 110a, an interaction database 110b and one or more digital content databases 110c.

The client computing devices 102, 103 connect to the communication network 104 in order to communicate with the server computing device 106 and the content delivery server 108 to provide input and receive output relating to the process of normalizing digital content across a plurality of digital content databases and generating personalized content recommendations as described herein. In some embodiments, the client computing devices 102, 103 are each coupled to an associated display device (not shown). For example, client computing devices 102, 103 can provide a graphical user interface (GUI) via the display device that is configured to receive input from a user of the device 102, 103 and to present output (e.g., digital content items) to the user that results from the methods and systems described herein.

Exemplary client computing devices 102, 103 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts two client computing devices 102, 103, it should be appreciated that the system 100 can include any number of client computing devices.

The communication network 104 enables the client computing devices 102, 103 to communicate with the server computing device 106 and the content delivery server 108. The network 104 is typically a wide area network, such as the Internet and/or a cellular network. In some embodiments, the network 104 is comprised of several discrete networks and/or sub-networks (e.g., cellular to Internet).

The server computing device 106 is a device including specialized hardware and/or software modules that execute on a processor and interact with memory modules of the server computing device 106, to receive data from other components of the system 100, transmit data to other components of the system 100, and perform functions for normalizing digital content across a plurality of digital content databases and generating personalized content recommendations as described herein. The server computing device 106 includes a user analysis module 106a, a content normalization module 106b, and a recommendation modeler 106c that execute on the processor of the server computing device 106. In some embodiments, the modules 106a, 106b, 106c are specialized sets of computer software instructions programmed onto one or more dedicated processors in the server computing device 106 and can include specifically-designated memory locations and/or registers for executing the specialized computer software instructions.

Although the modules 106a, 106b, 106c are shown in FIG. 1 as executing within the same server computing device 106, in some embodiments the functionality of the modules 106a, 106b, 106c can be distributed among a plurality of server computing devices. As shown in FIG. 1, the server computing device 106 enables the modules 106a, 106b, 106c to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 106a, 106b, 106c is described in detail below.

The content delivery server 108 is a computing device (or set of computing devices) to which the client computing devices 102, 103 can connect to retrieve and display digital content items (such as web pages). The content delivery server 108 is a combination of hardware, including one or more special-purpose processors and one or more physical memory modules, and specialized software modules (such as content delivery module 108a) that are executed by a processor of the content delivery server 108. In some embodiments, the content delivery server 108 is an online content platform that provides certain digital content objects (e.g., text content such as articles, web pages, etc.; digital media such as videos, podcasts, etc.; alerts such as notification messages, etc.) via a content delivery network. Typically, a website comprises a plurality of visual and non-visual elements that make up the content transmitted and displayed to a user when, e.g., browser software on the client computing device 102, 103 connects to the content delivery server 108 via a communication network 104 (e.g., Internet) and requests content from the website. The elements of a website include, but are not limited to, webpages (e.g., HTML documents), image files, layouts, color sets, stylesheets, document object models (DOM), tracking elements, metadata, URLs, and content (e.g., text, audio, video). In some embodiments, the content delivery server 108 communicates with an app installed on the client computing device 102, 103 to present digital content items to a user of the device via the app.

The databases 110a-110c are located on a computing device (or in some embodiments, on a set of computing devices) coupled to the server computing device 106 and content delivery server 108 and the databases are configured to receive, generate, and store specific segments of data relating to the process of normalizing digital content across a plurality of digital content databases and generating personalized content recommendations as described herein. In some embodiments, all or a portion of the databases 110a-110c can be integrated with the server computing device 106, the content delivery server 108, or be located on a separate computing device or devices. The databases 110a-110c can comprise one or more databases configured to store portions of data used by the other components of the system 100, as will be described in greater detail below. An exemplary database 110a-110c is MySQL™ available from Oracle Corp. of Redwood City, Calif.

In some embodiments, the user database 110a comprises user profile information for a plurality of users of the system 100; typically, each user is associated with one or more client computing devices 102, 103. The user profile information can include, but is not limited to, user financial information/user demographic information (e.g., account activity or information, transaction activity, etc.) when a digital content item was presented to the user, historical user interaction data relating to digital content items presented to the user (e.g., clickstream URL data, ratings, feedback, etc.), and historical user digital content item consumption information (e.g., which digital content items has the user viewed/interacted with in the past). Each of the above categories of information can be associated with an event, where an event is defined as the presentation or suggestion of a particular digital content item to a user.

In some embodiments, the interaction database 110b comprises a historical list of events relating to a user's interaction with one or more digital content items. In some embodiments, the interaction database 110b can utilize a specialized data structure such as a response matrix, where each cell of the matrix comprises an indication of how the user responded to a particular digital content item when the content item was presented to the user. As an example, for each event and corresponding digital content item, the interaction database 110b can store data such as a identifier for the digital content item, an identifier of the user and/or client computing device 102, 103 on which the digital content item was presented, a timestamp of when the digital content item was presented, and a response from the user and/or client computing device 102, 103 with respect to the digital content item (e.g., click, view time, scroll time, etc.)

In some embodiments, the digital content databases 110c can comprise structured computer text corresponding to the content of each digital content item in conjunction with one or more binary content files that comprise the digital content item itself. For example, the digital content databases 110c can include a specialized data structure that maps the structured computer text for a digital content item with one or more pointers or addresses to a network location that stores the one or more binary content files for the corresponding digital content item (e.g., content delivery servers, archive data storage, and the like).

Figure 2:
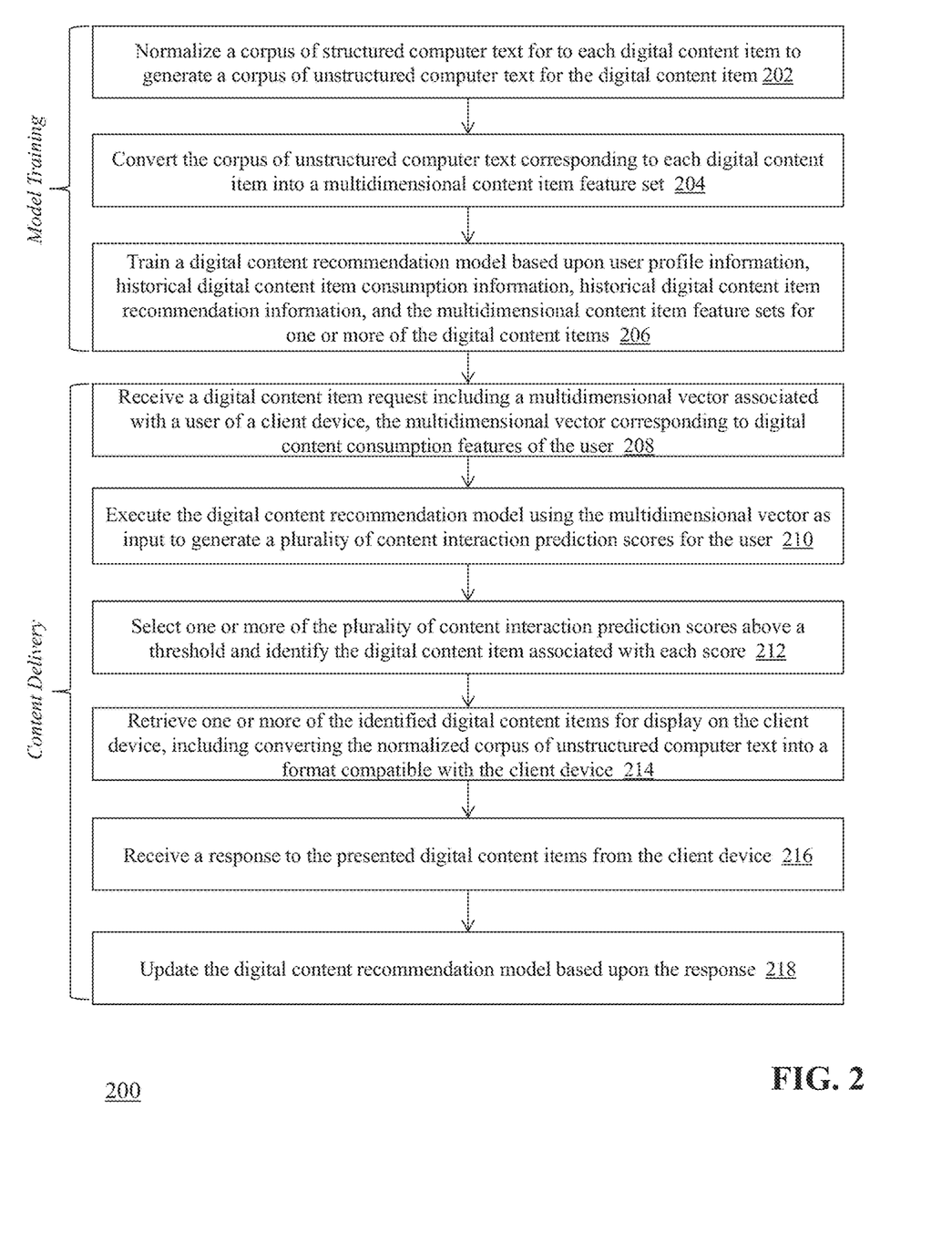
FIG. 2 is a flow diagram of a computerized method of normalizing digital content across a plurality of digital content databases and generating personalized content recommendations.

FIG. 2 is a computerized method 200 of normalizing digital content across a plurality of digital content databases and generating personalized content recommendations, using the system 100 of FIG. 1. As shown in FIG. 2, the steps 202, 204, 206 can be considered as a training phase, where the artificial intelligence content recommendation model described herein is trained using historical user information and digital item content information. As part of this training phase, to prepare the digital content items for analysis and recommendation, the content normalization module 106b normalizes (202) a corpus of unstructured computer text for each digital content item to generate a corpus of normalized computer text for the digital content item and then converts (204) the corpus of normalized computer text corresponding to each digital content item into a multidimensional content item feature set.

Figure 3:
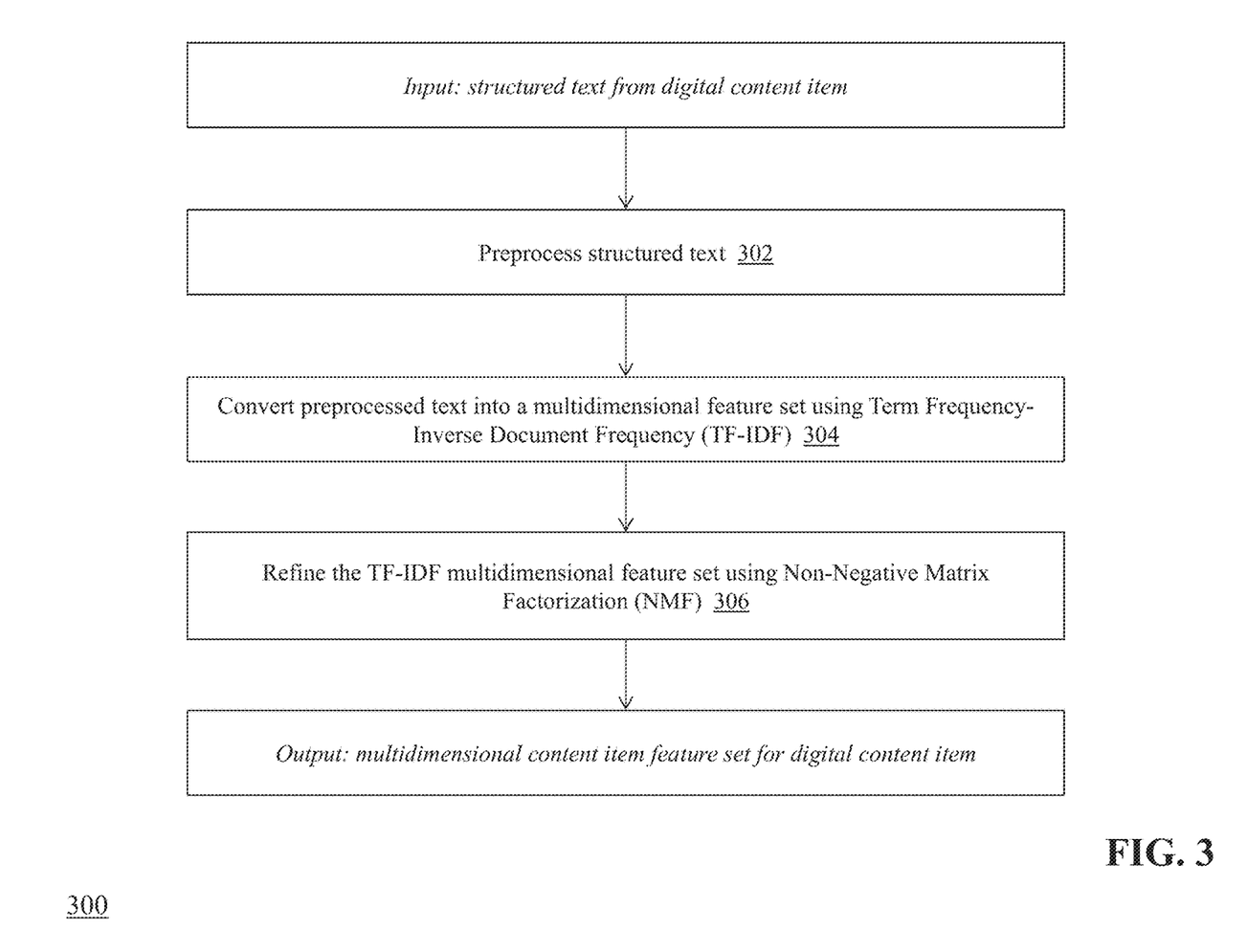
FIG. 3 is a flow diagram of a computerized method of normalizing a corpus of unstructured computer text for a digital content item to generate a corpus of normalized computer text and converting the normalized computer text into a multidimensional content item feature set.

FIG. 3 is a flow diagram of a computerized method 300 of normalizing a corpus of unstructured computer text for a digital content item to generate a corpus of normalized computer text and converting the normalized computer text into a multidimensional content item feature set, using the system 100 of FIG. 1. The content normalization module 106b receives as input the unstructured computer text for each digital content item from digital content database 110c. In one example, as new content items are created, the content items can be pushed or published to the content normalization module 106b for processing. Providing new content items to the module 106b can be accomplished in a variety of different ways, including but not limited to batch (e.g., a periodic process whereby new content items are transmitted to the module 106b and/or the module 106b is periodically notified that new content items are available for processing) or on-demand (e.g., as soon as new content items are created and stored, the module 106b retrieves the new content items for processing).

For each digital content item, the content normalization module 106b preprocesses (302) the unstructured text. As mentioned above, there are many different types of digital content items that the content normalization module 106b is capable of normalizing—such as text documents, web pages, digital audio files, digital video files, alert messages, notification messages, and the like. It should be appreciated that certain types of content items (such as text documents and web pages) are comprised of computer text that represents the content of the digital content item. For example, a digital document may comprise a corpus of unstructured computer text that contains the content of the document, along with one or more items of metadata that describe or define certain aspects of the digital document (e.g., file type, file size, date created, and so forth). In another example, a web page of a news article may comprise a corpus of unstructured computer text that contains the content of the article, as well as structured text (e.g., HTML code) that surrounds the article. For these types of digital content items, the module 106b can recognize the corpus of unstructured computer text for use as input for the normalization process (and if necessary, parse out or remove the surrounding code or text that is not directly part of the content of the digital content item).

However, other types of content items (such as digital audio and video) may not include a corpus of structured or unstructured computer text that represents the content of the item—instead these items may simply comprise one or more binary content files (e.g., .mpeg, .wav, .mov, etc.) that make up the digital content item. In these cases, the content normalization module 106b can utilize, e.g., a speech recognition or speech-to-text processing engine to convert a waveform or other type of file associated with audio content of the digital content item into a corpus of structured computer text. Exemplary speech recognition engines can include Google Cloud Speech-to-Text™ API, or Microsoft Azure Speech to Text™ API. In some embodiments, the corpus of structured computer text comprises a data file (e.g., .TXT, .XML) containing words, sentences, and punctuation corresponding to the speech as transcribed from the audio data extracted by the content normalization module 106b.

In some embodiments, the content normalization module 106b performs functions on the corpus of unstructured computer text, such as converting all of the unstructured text to lowercase; removing commonly-occurring words and/or non-informative words (e.g., by filtering the text using a defined list of stopwords, including words learned by the system over time); and lemmatizing at least a portion of the remaining words. In some embodiments, the content normalization module 106b can store the preprocessed corpus of structured computer text in a database. The content normalization module 106a also stores any binary content files and corresponding metadata that are associated with the incoming digital content item in one or more databases, so that the binary content files and the metadata can be retrieved in response to a content item request as will be explained in greater detail below.

Continuing with FIG. 3, the content normalization module 106b converts the preprocessed corpus of normalized computer text into a multidimensional feature set using, e.g., Term Frequency-Inverse Document Frequency (TF-IDF) techniques. TF-IDF is a popular method for determining the significance and/or relevance of each term in a particular corpus of text, weighted by the term's occurrence in the entire corpus of text. The content normalization module 106b can generate a multidimensional feature set that corresponds to the TF-IDF for the unstructured text. Additional information about the application of TF-IDF is available from https://en.wikipedia.org/wiki/Tf%E2%80%93idf. In some embodiments, the module 106b uses the sklearn.feature_extraction.text.TFIDFVectorizer module (http://scikit-learn.org/stable/modules/generated/sklearn.feature_extraction.text.TfidfVectorizer.html) to extract the TF-IDF features. For example, if the input text below is fed in to the module 106b as an input, the module 106b would return a vector representation as shown below:

Input: "When you open a retail brokerage or retirement account, your cash automatically goes into our money market fund."

Output: [0, 0, 0, 0, 0.4789, 0, 0, 0, 0, 1.46278 . . . . ]

The output is generally an n-dimensional vector, where n would be the number of words in the vocabulary (all the words that were ever used in all the content items put together).

The application of a TF-IDF algorithm to the unstructured text typically results in a multidimensional feature set having a lot of features, many of which may be redundant or irrelevant for the purposes of content recommendation. Therefore, the content normalization module 106b can refine (306) the TF-IDF multidimensional feature set using, e.g., non-negative matrix factorization (NMF) algorithms—which can further reduce the number of dimensions of the feature set to be used for the recommendation modeler. Additional information about the application of NMF is available from https://en.wikipedia.org/wiki/Non-negative matrix factorization. In some embodiments, the module 106b uses the sklearn.decomposition.NMF module (http://scikit-learn.org/stable/modules/generated/sklearn.decomposition.NMF.html) to extract the NMF Features. For example, NMF takes in TF-IDF vectors from the previous step as an input and outputs a condensed vector as shown below:

Input: [0, 0, 0, 0, 0.4789, 0, 0, 0, 0, 1.46278 . . . . ]
Output: [10.372, 0.7252, 4.362, 1.26, 2.364]

The input dimensions are n (number of words in the vocabulary) and the output dimensions are, in this example, thirty. After application of the NMF algorithms, the content normalization module 106b generates a multidimensional content item feature set corresponding to each digital content item.

Turning back to FIG. 2, the recommendation modeler 106c trains (206) a digital content recommendation model based upon user profile information for a plurality of users, historical digital content item consumption information for the plurality of users, and the multidimensional content item feature sets for one or more of the digital content items that are generated by the module 106c. In some embodiments, the digital content recommendation model is a deep neural network with a plurality of layers that process and classify the user profile information, historical digital content item consumption information, and the multidimensional content item feature sets using artificial intelligence techniques to generate one or more digital content item recommendations for a particular user or users. In some embodiments, the digital content recommendation model is trained using one or more of the following machine learning techniques: logistic regression or random forest. The recommendation modeler 106c trains the digital content recommendation model on the historical digital content item consumption information, the user profile information, and the multidimensional content item feature sets to generate predictions of digital content items that are likely to be of interest to a particular user or be interacted with by a particular user, based upon the features of the digital content item, the user's past interaction history, and the user's profile information. Generally, this information is converted from different data types into one or more vectors (e.g., an array of one or more numeric values) that define the relevant features of the underlying data.

Figure 4:
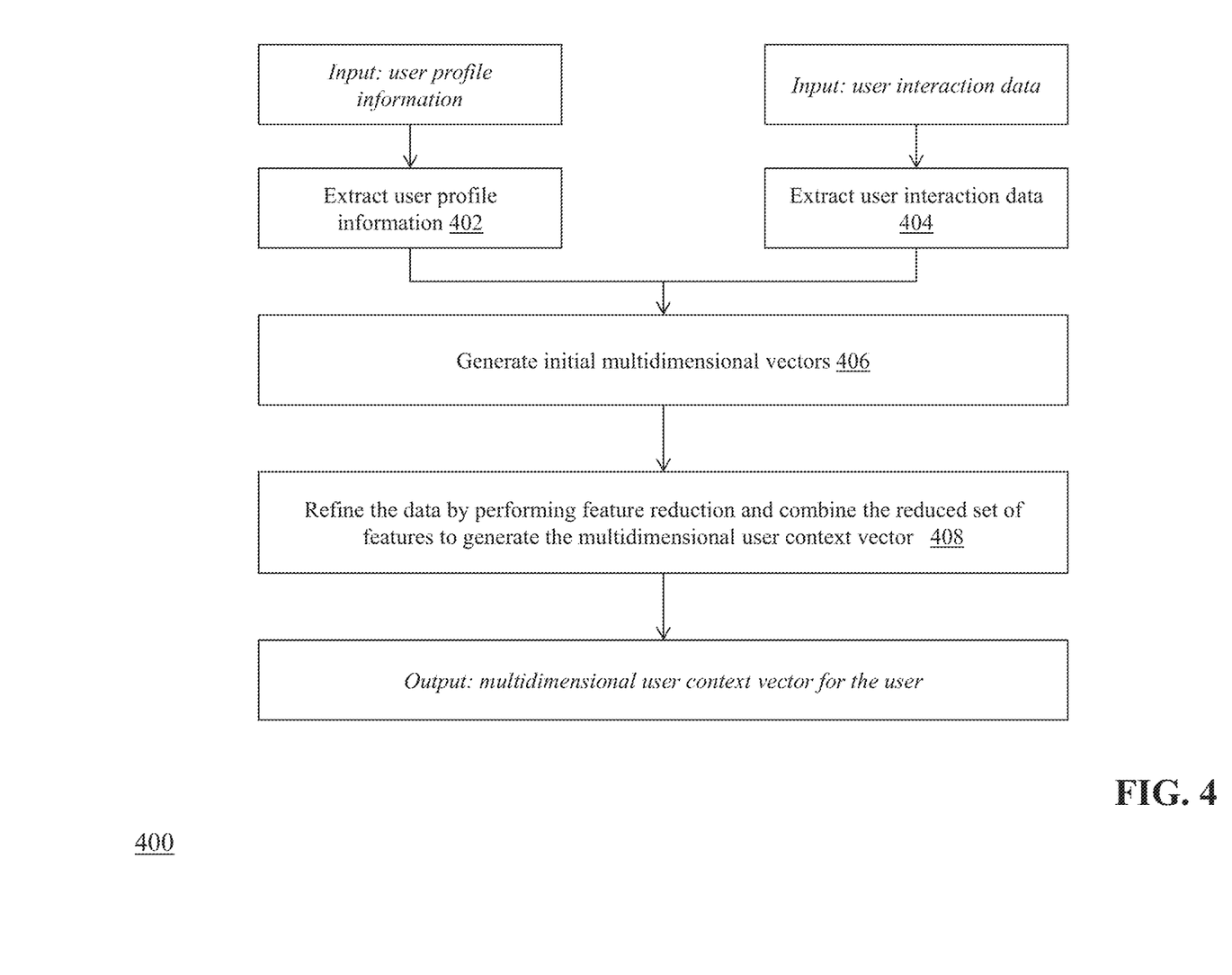
FIG. 4 is a flow diagram of a computerized method of converting historical user profile information and historical digital content item consumption information into a multidimensional user context vector for the user.

For the user profile information, the content normalization module 106b can receive from the user analysis module 106a a multidimensional user context vector associated with each user of a plurality of users (e.g., users that have previously used the system 100 in order to be presented with digital content items on client devices 102, 103 and provided feedback on those items). FIG. 4 is a flow diagram of a computerized method 400 of converting historical user profile information and historical digital content item consumption information into a multidimensional user context vector for the user, using the system 100 of FIG. 1. The user analysis module 106a extracts (402) user profile information for each user from user database 110a and/or interaction database 110b. As mentioned above, the user profile information for each user can include financial information/demographic information of the user, historical user interaction data relating to digital content items presented to the user, and historical user digital content item consumption information. In some embodiments, the user analysis module 106a can perform transformations on the user profile information (e.g., sum, average, log transformation, standard deviation) across various time periods—in order to determine the significance of certain data points (and corresponding transformations) in the overall content recommendation process. In a first example, for varying time periods, the module 106a can extract, e.g., the number of times a customer has contacted a call center in the last one-, three-, or six months—these amounts to three different features for the user profile information. In a second example, for varying transformations, the module 106a can determine average and standard deviation of the withdrawal amount for a fund in the last six months—these amounts to two different features for the user profile information.

The user analysis module 106a also extracts (404) user interaction data for each user from interaction database 110b. As mentioned above, the user interaction data can be an indication of how the user responded to a particular digital content item when the content item was presented to the user. As an example, for each event and corresponding digital content item, the interaction database 110b can store data such as a identifier for the digital content item, an identifier of the user and/or client computing device 102, 103 on which the digital content item was presented, a timestamp of when the digital content item was presented, and a response from the user and/or client computing device 102, 103 with respect to the digital content item (e.g., click, view time, scroll time, etc.).

The user analysis module 106a generates (406) one or more initial multidimensional vectors comprising a plurality of different features (i.e., numeric values) that represent the user profile information and the user interaction information as processed by the module 106a. In some cases, the initial vector comprises features that may be redundant or irrelevant to the model training and prediction process described herein. The user analysis module 106a then refines (408) the initial multidimensional feature vector data by removing redundant or irrelevant features and combines the reduced set of features to generate a final multidimensional vector for each user.

Turning back to FIG. 2, once the system has generated the multidimensional vectors for the plurality of users, the recommendation modeler 106c trains (206) the digital content recommendation model based upon the multidimensional vectors associated with the plurality of users and the historical user content recommendation information for the plurality of users (e.g., as stored in the interaction database 110b). As mentioned above, in some embodiments the digital content recommendation model is a contextual reinforcement-learning based artificial intelligence model that generates a probability or confidence score that a particular user will interact with a particular digital content item. In some embodiments, the digital content recommendation model includes a set of regression coefficients that are used by the system 100 to calculate a content interaction prediction score for the digital content item for a particular user (e.g., by using the multidimensional user context vector as input). The recommendation modeler 106c can utilize the digital content recommendation model to determine a set of one or more digital content items that have a high probability for interaction by a particular user, and the recommendation modeler 106c can leverage exploitation and exploration techniques (e.g., Thomson sampling) to garner feedback from users on specific digital content items and use that feedback to strengthen the digital content recommendation model, as described herein.

Once the digital content recommendation model is trained, the recommendation modeler 106c can be used to process an incoming digital content item request received from a client computing device 102, 103 and generate one or more digital content item recommendations based upon predicted likelihood that the user at the client computing device will interact with one or more digital content items, based upon that user's characteristics. As shown in FIG. 2, the system transitions to a content delivery phase (i.e., steps 208, 210, 212, 214, 216, 218). The recommendation modeler 106c receives (208) a digital content item request from a client computing device 102, 103, and the request includes a multidimensional vector associated with a user of the client device. The multidimensional vector corresponds to digital content consumption features of the user. In some embodiments, the digital content consumption features relate to the user's prior activity on the client computing device with respect to one or more digital content items—e.g., did the user view, click on, and/or otherwise interact with a particular digital content item, was there a particular sequence in which the user interacted with a plurality of content items, etc. In just one example, the user analysis module 106a can determine click URL sequences associated with the user. For example, the user analysis module 106a can determine one or more sequences of URLs browsed by the user during the prior N sessions by querying the interaction database 110b. The user analysis module 106a can transforms each URL sequence into a count vector by counting a number of times that each URL is accessed during a particular user session. Typically, each URL in the sequence of URLs can be associated with a digital content item. The user analysis module 106a uses the URL sequences to extract the text corresponding to each of the browsed URLs (i.e., the processed corpus of text as described above) from, e.g., the digital content database 110c.

The modeler 106c then executes (210) the digital content recommendation model using the multidimensional vector as input to generate a plurality of content interaction prediction scores, each content prediction score associated with one of the digital content items. For example, the modeler 106c executes the digital content recommendation model by providing the multidimensional vector (corresponding to the digital content consumption features of the user) as input to the model, and processing the vector through the layers of the model to arrive at one or more content prediction scores, each associated with a digital content item available for presentation to the user at client device 102, 103. It should be appreciated that the model processes the input vector to identify one or more digital content items that have a multidimensional content item feature set that aligns with characteristics of the multidimensional input vector of the user, based upon prior users' interactions with the identified digital content items (or content items that have similar feature sets to the content items with which prior users interacted).

The modeler 106c selects (212) one or more of the plurality of content interaction prediction scores above a predefined threshold (i.e., scores that indicate a positive likelihood that the user will interact with the corresponding digital content item(s)) and the modeler 106c identifies the digital content item associated with each selected content interaction prediction score. In some embodiments, the content interaction prediction scores are between 0 and 1, with more positive scores being closer to 1 and more negative scores being closer to 0. The modeler 106c determines a number of content interaction prediction scores that exhibit a high value and in some embodiments, the modeler 106c can pass indicia of the corresponding digital content items (e.g., a content identifier, a URL, an address for the underlying binary content files, etc.) that have the selected content interaction prediction scores above the threshold to the content delivery server 108.

The content delivery module 108a retrieves (212) one or more of the identified digital content items for display on the client computing device 102, 103. For example, the content delivery module 108a can search the digital content database (s) 110c for the relevant digital content items and retrieve the corresponding normalized computer text for the digital content items along with, in some cases, retrieving the associated binary content files and metadata for the content items). As part of the retrieval process, the content delivery module 108a converts the normalized corpus of computer text (as stored in the databases 110c) into a format that is compatible with the specific client computing device 102, 103 on which the content item will be displayed. For example, the content delivery module 108a can determine that the client device 102, 103 requires a specific document format (e.g., HTML, .mp3, .mp4, .wav, etc.)—so the module 108a captures the normalized corpus of text for the digital content item and converts the text into a structured document format for display on the client device.

The content delivery module 108a receives from the client device 102, 103 (216) a response (e.g., click or no click, etc.) to the presented digital content item(s). The response is transmitted back to the recommendation modeler 106c, which uses the response to update (218) the digital content recommendation model. For example, the user may have interacted with the digital content item—which indicates that the user found the digital content item engaging or useful. The recommendation modeler 106c can store the identity of the digital content item (and/or the corresponding multidimensional content item feature set), the user profile information (and/or the multidimensional vector generated from the user profile information), and the content item interaction information (and/or the corresponding digital content item consumption vector) in the databases 110a-110c and use this data as input to execute the digital content recommendation model both to (i) determine whether a content prediction score generated by the model for the digital content item was accurate prior to the update and (ii) refine the digital content recommendation model based upon the actual outcome (i.e., click, no click) for the digital content item so that the model is subsequently more accurate for future executions.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), automobiles with enhanced computing functionality (e.g., Apple® CarPlay™, Android Auto™) voice-based assistant devices and applications (e.g., Apple® Siri™, Google® Assistant™ Microsoft® Cortana™, Amazon® Alexa™), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing devices include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for normalizing digital content across a plurality of digital content databases and generating personalized content recommendations, the system comprising:
    a plurality of digital content databases, each digital content database comprising one or more digital content items, each digital content item including a corpus of structured computer text and one or more binary content files;
    a computer data store comprising (i) user profile information for each of a plurality of users, (ii) historical digital content item consumption information for each of the plurality of users, and (iii) historical digital content item recommendation information for each of the plurality of users; and
    a server computing device in communication with the plurality of digital content databases and the computer data store, the server computing device comprising a memory to store computer-executable instructions and a processor that executes the computer-executable instructions to:
        normalize a corpus of structured computer text for each digital content item to generate a corpus of unstructured computer text for the digital content item;
        convert the corpus of unstructured computer text corresponding to each digital content item into a multidimensional content item feature set;
        perform transformations on one or more data elements of the user profile information for a plurality of time periods to generate one or more transformed data elements and insert the transformed data elements as additional features of the user profile information;
        train a digital content recommendation model based upon the transformed and non-transformed user profile information for each of a plurality of users, the historical digital content item consumption information for each of the plurality of users, the historical digital content item recommendation information for each of the plurality of users, and the multidimensional content item feature sets for one or more of the digital content items;
        receive, from a client computing device, a digital content item request including a multidimensional vector associated with a user of the client computing device, the multidimensional vector corresponding to digital content consumption features of the user;
        execute the digital content recommendation model using the multidimensional vector as input to generate a plurality of content interaction prediction scores for the user, each content interaction prediction score associated with one of the digital content items;
        select one or more of the plurality of content interaction prediction scores above a predetermined threshold and identify the digital content item associated with each selected content interaction prediction score;
        retrieve one or more of the identified digital content items for display on the client computing device, including converting the normalized corpus of unstructured computer text for the identified digital content items into a format compatible with the client computing device and displaying the formatted computer text and the one or more binary content files for the identified digital content items;
        receive a response to the presented digital content items from the client computing device; and
        update the digital content recommendation model based upon the response to the presented digital content items.

2. The system of claim 1, wherein normalizing the extracted corpus of structured computer text for each digital content item to generate a corpus of unstructured computer text for the digital content item comprises removing programmatic code from the corpus of structured computer text.

3. The system of claim 2, wherein the programmatic code comprises HTML tags.

4. The system of claim 1, wherein the one or more binary content files comprise one or more of: image files, audio files, video files, JavaScript files, PDF files, or CSS files.

5. The system of claim 1, wherein the content interaction prediction score represents a likelihood that the user interacts with the associated digital content item when presented on the client computing device.

6. The system of claim 1, wherein converting the normalized corpus of unstructured computer text for the identified digital content items into a format compatible with the client computing device comprises applying a programmatic structure to the normalized corpus of unstructured computer text, the programmatic structure associated with at least one of a hardware type of the client computing device, an operating system of the client computing device, a browser application of the client computing device, or a native application of the client computing device.

7. The system of claim 1, wherein the response to the presented digital content items comprises indicia that the user of the client computing device viewed the presented digital content items or indicia that the user of the client computing device interacted with the presented digital content items.

8. The system of claim 1, wherein retrieving one or more of the identified digital content items for display on the client computing device comprises calling one or more content application programming interfaces (APIs) that return the identified digital content items to the server computing device.

9. The system of claim 1, wherein updating the digital content recommendation model based upon the response to the presented digital content items occurs in real-time.

10. The system of claim 1, wherein the server computing device stores the corpus of unstructured computer text for the digital content item in association with the one or more binary content files for the digital content item.

11. The system of claim 1, wherein the client computing device comprises a browser application on a computing device or a native application on a computing device.

12. The system of claim 1, wherein the server computing device generates a multidimensional vector based upon the user profile information for each user, the multidimensional vector comprising one or more features corresponding to the transformed and non-transformed data elements of the user profile information, and the server computing device trains the digital content recommendation model using the multidimensional vector.

13. A computerized method of normalizing digital content across a plurality of digital content databases and generating personalized content recommendations, the method comprising:

storing, by a plurality of digital content databases, one or more digital content items, each digital content item including a corpus of structured computer text and one or more binary content files;

storing, by a computer data store, (i) user profile information for each of a plurality of users, (ii) historical digital content item consumption information for each of the plurality of users, and (iii) historical digital content item recommendation information for each of the plurality of users;

normalizing, by the server computing device, the corpus of structured computer text for each digital content item to generate a corpus of unstructured computer text for the digital content item;

converting, by the server computing device, the corpus of unstructured computer text corresponding to each digital content item into a multidimensional content item feature set;

performing, by the server computing device, transformations on one or more data elements of the user profile information for a plurality of time periods to generate one or more transformed data elements and insert the transformed data elements as additional features of the user profile information;

training, by the server computing device, a digital content recommendation model based upon the transformed and non-transformed user profile information for each of a plurality of users, the historical digital content item consumption information for each of the plurality of users, the historical digital content item recommendation information for each of the plurality of users, and the multidimensional content item feature sets for one or more of the digital content items;

receiving, from a client computing device, a digital content item request including a multidimensional vector associated with a user of the client computing device, the multidimensional vector corresponding to digital content consumption features of the user;

executing, by the server computing device, the digital content recommendation model using the multidimensional vector as input to generate a plurality of content interaction prediction scores for the user, each content interaction prediction score associated with one of the digital content items;

selecting, by the server computing device, one or more of the plurality of content interaction prediction scores above a predetermined threshold and identify the digital content item associated with each selected content interaction prediction score;

retrieving, by the server computing device, one or more of the identified digital content items for display on the client computing device, including converting the normalized corpus of unstructured computer text for the identified digital content items into a format compatible with the client computing device and displaying the formatted computer text and the one or more binary content files for the identified digital content items;

receiving, by the server computing device, a response to the presented digital content items from the client computing device; and updating, by the server computing device, the digital content recommendation model based upon the response to the presented digital content items.

14. The method of claim 13, wherein normalizing the extracted corpus of structured computer text for each digital content item to generate a corpus of unstructured computer text for the digital content item comprises removing programmatic code from the corpus of structured computer text.

15. The method of claim 14, wherein the programmatic code comprises HTML tags.

16. The method of claim 13, wherein the one or more binary content files comprise one or more of: image files, audio files, video files, JavaScript files, PDF files, or CSS files.

17. The method of claim 13, wherein the content interaction prediction score represents a likelihood that the user interacts with the associated digital content item when presented on the client computing device.

18. The method of claim 13, wherein converting the normalized corpus of unstructured computer text for the identified digital content items into a format compatible with the client computing device comprises applying a programmatic structure to the normalized corpus of unstructured computer text, the programmatic structure associated with at least one of a hardware type of the client computing device, an operating system of the client computing device, a browser application of the client computing device, or a native application of the client computing device.

19. The method of claim 13, wherein the response to the presented digital content items comprises indicia that the user of the client computing device viewed the presented digital content items or indicia that the user of the client computing device interacted with the presented digital content items.

20. The method of claim 13, wherein retrieving one or more of the identified digital content items for display on the client computing device comprises calling one or more content application programming interfaces (APIs) that return the identified digital content items to the server computing device.

21. The method of claim 13, wherein updating the digital content recommendation model based upon the response to the presented digital content items occurs in real-time.

22. The method of claim 13, wherein the server computing devices stores the corpus of unstructured computer text for the digital content item in association with the one or more binary content files for the digital content item.

23. The method of claim 13, wherein the client computing device comprises a browser application on a computing device or a native application on a computing device.

24. The method of claim 13, wherein the server computing device generates a multidimensional vector based upon the user profile information for each user, the multidimensional vector comprising one or more features corresponding to the transformed and non-transformed data elements of the user profile information, and the server computing device trains the digital content recommendation model using the multidimensional vector.

* * * * *